UNITED STATES PATENT OFFICE 2,422,648

DIHYDROPYRAN COMPOUNDS AND THEIR PREPARATION

Paul H. Williams, Berkeley, and Seaver A. Ballard, Oakland, Calif., assignors to Shell Development Company, San Francisco, Calif., a corporation of Delaware No Drawing. Application October 24, 1944, Serial No. 560,206

11 Claims. (Cl. 260—333)

This invention relates to novel oxygen-containing unsaturated organic compounds, and to a process for their preparation.

More particularly, this invention provides a process for reacting an unsaturated alcohol possessing an unsaturated tertiary carbon atom which is directly attached to a saturated carbon atom which is linked directly to the carbinol group, with a ketone in the presence of a suitable catalyst and at a temperature and for a time sufficient to effect substantial conversion of the reactants to the desired organic unsaturated oxygen-containing compounds.

The unsaturated alcohols which may be reacted according to the process of the invention may be represented by the formula

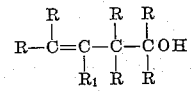

wherein $R_1$ is a hydrocarbon radical and wherein the R's may be the same or different and represent the hydrogen atom or the hydrocarbon radicals which may be cyclic or acyclic, saturated or unsaturated. However, $R_1$ and the R's are preferably of a saturated character. $R_1$ is preferably a non-olefinic hydrocarbon radical, i. e. a hydrocarbon radical which does not contain any olefinic linkages between carbon atoms of aliphatic character; and the R's may be selected from the group consisting of the hydrogen atom and the non-olefinic hydrocarbon radicals. The non-olefinic hydrocarbon radicals are the alkyl, aryl, alkaryl, aralkyl and cycloalkyl radicals such as methyl, ethyl, propyl, isopropyl, butyl, isobutyl, tertiary butyl, secondary butyl, amyl, isopentyl, hexyl, heptyl, octyl, benzyl, phenyl, tolyl, cyclopropyl, cyclobutyl, cyclopentyl, cyclohexyl, and the like and their homologues and analogues. Depending upon the members represented by the R's attached to the carbinal group, the unsaturated alcohol may be primary, secondary or tertiary. It has been found particularly convenient in carrying out the process of the invention to use an unsaturated alcohol which is secondary, especially one which may be represented by the formula

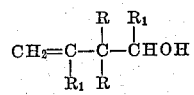

wherein the R's may be the same or different and represent the hydrogen atom or a non-olefinic hydrocarbon radical, and wherein the $(R_1)$'s may be the same or different and represent non-olefinic hydrocarbon radicals.

Examples of suitable unsaturated alcohols which may be reacted with ketones according to the process of the invention are 4-methyl-4-pentane-2-ol, 4-ethyl-4-pentane-2-ol, 4-methyl-4-hexane-2-ol, 5-propyl-5-hexane-3-ol, 5-phenyl-5-hexane-3-ol, 4-benzyl-4-octene-2-ol, 3,4-dimethyl-4-pentene-2-ol, 3,3,4-triethyl-4-hexene-2-ol, and the like and their homologues and analogues. These unsaturated alcohols may be prepared by any suitable means such as by dehydrating the corresponding glycol (e. g. 4-methyl-4-pentene-2-ol is prepared by dehydrating diacetone glycol).

The ketones which are to be reacted with the unsaturated alcohols may be saturated or unsaturated, cyclic or acyclic, and may be represented by the formula

Wherein $R_2$ and $R_3$ may be the same or different and represent hydrocarbon radicals such as the alkyl, aryl, alkaryl, aralkyl, alkenyl, aralkenyl, alkenaryl, cycloalkyl and cycloalkenyl radicals, or $R_2$ and $R_3$ together may be a single divalent hydrocarbon radical whereby the above formula represents a cyclic ketone. Representative examples of the ketones are acetone, methyl ethyl ketone, methyl isobutyl ketone, ethyl propyl ketone, diisobutyl ketone, diamyl ketone, methyl vinyl ketone, ethylidene acetone, allyl acetone, mesityl oxide, phorone, isophorone, dihydroisophorone, benzophenone, acetophenone, propriophenone, o-methylenecyclohexanone, cyclohexanone, cyclohexenone, and the like and their homologues and analogues.

The unsaturated oxygen-containing compounds which are produced by reacting the unsaturated alcohol and ketone according to the process of the invention are cyclic ethers which contain at least one unsaturated linkage and have the following structure or structures isomeric therewith.

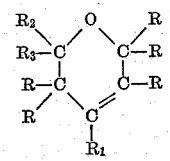

wherein $R_1$, $R_2$ and $R_3$ are hydrocarbon radicals and the remaining R's are members of the group consisting of the hydrogen atom and the hydrocarbon radicals. For example, the reaction product of 4-methyl-4-pentane-2-ol with a ketone is believed to consist predominantly of dihydropyrans having the following structure

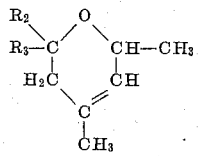

wherein the constituency of $R_2$ and $R_3$ depends upon the specific ketone reacted with the 4-methyl-4-pentene-2-ol. As indicated by the above formulae, the double bonds may be in the 3,4-position. However, the double bonds may be in the 4,5-position or in the side chain forming a methylene group attached to the carbon atom in position number 4. The product in each case may be a mixture of all three isomers.

The formation of the substituted dihydropyrans may be brought about by treating a suitable unsaturated alcohol with a ketone in the presence of an acid-acting compound. Suitable acids and acid-acting compounds include the mineral acids, mineral acid-acting salts and other substances capable of acting as mineral acids under the conditions of operation and in contact with the reactants and water in the reaction mixture. For example, there may be employed the strong mineral acids such as $H_2SO_4$, $H_2S_2O_7$, $HPO_3$, $CHI$, $HBr$, $H_4P_2O_7$, $H_3PO_4$, $HNO_3$, $HClO_4$, and the like. Other suitable substances are compounds which form mineral acids with water such as $SO_2Cl_2$, $SOCl_2$, $SOBr_2$, $SO_2$, $N_2O_3$, $NOCl$, $POCl_3$, $PCl_3$, $PCl_5$ and the like and the mineral acid-acting salts as $ZnSO_4$, $ZnCl_2$, $FeCl_3$, $AlCl_3$, $Fe_2(SO_4)_3$, $NaHSO_4$, $Al_2(SO_4)_3$, $NaH_2PO_4$, and the like. In addition, the reaction may take place in the presence of organic salts and compounds capable of acting as mineral acids under the conditions of operation such as ethyl sulphonic acid, benzene sulphonic acid and its homologues and analogues, p-toluenesulfonic acid, dialkyl and alkyle acid sulphates, alkylated phosphoric and sulphonic acids, halogenated organic acids, acids such as sulpho-acetic, acid halides and compounds such as aniline hydrochloride and the like. In some cases, the process may be executed employing the stronger organic acids, for example, oxalic acid.

The reaction will take place at any temperature, preferably above about 0° C. but preferably not substantially above that temperature at which the reactants and/or products may be destroyed or undesirably altered to an excessive degree. For example, it is desirable to maintain the reaction at a temperature not excessively above the temperature of dehydration of the unsaturated alcohol reactant. While the reaction does take place at lower temperatures around room temperature, it has been found advantageous to maintain a temperature above about 50° C. Particularly high yields have been obtained by employing a temperature above about 85° C. but not substantially above that temperature which will bring about excessive dehydration of the unsaturated alcohol. For example, high yields of product have been obtained by reacting ketones with 4-methyl-4-pentene-2-ol at temperatures between about 85° C. and about 105° C. (the dehydration temperature of 4-methyl-4-pentene-2-ol is around 100° C.). The reaction may be carried out under any suitable pressure, elevated, reduced or atmospheric. It has been discovered that high yields are obtained when approximately atmospheric pressures are maintained.

Since it has been found particularly effective to execute the process of the invention at elevated temperatures, it is convenient at these elevated temperatures to use an acid or acid-acting compound which does not tend to promote charring. Although acids or acid-acting compounds which tend to promote charring, such as sulfuric acid, may be used at elevated temperatures, it is more convenient to use catalysts such as p-toluenesulfonic acid. Under reaction conditions using an elevated temperature and a catalyst such as p-toluenesulfonic acid, the unsaturated alcohol and ketone form the substituted dihydropyran almost completely with only small amounts, if any, of intermediates remaining at the reaction end. However, if less stringent reaction conditions are maintained, for example, if a lower temperature is employed and/or if a less active catalyst is used, substantial amounts of intermediates may be isolated in some cases. These intermediates may be further reacted under dehydration conditions, e. g. in the presence of p-toluenesulfonic acid, to produce the final substituted dihydropyran. Some of the intermediates are considered to be hydrates of the substituted dihydropyrans or isomers thereof, and some may have the following structures or structures isomeric therewith:

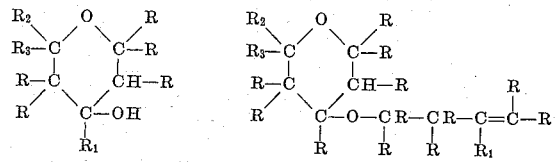

The substituted tetrahydropyranols are also produced by subjecting the corresponding substituted dihydropyrans to hydration, for example, in the presence of about 65% sulfuric acid, or by passing the dihydropyran in the vapor phase with steam over an acidic catalyst, etc.

For the purpose of illustrating the invention and rendering the principles clear and understandable, the reaction assumed to occur is represented by the specific equation for the reaction of 4-methyl-4-pentene-2-ol with acetone in the presence of an acid-acting compound to form the corresponding dihydropyran.

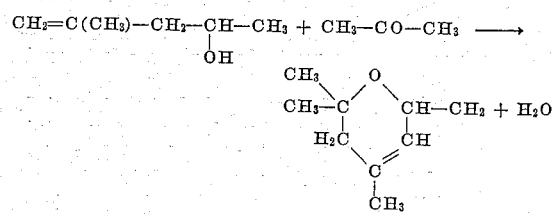

If intermediates corresponding to the following formulae

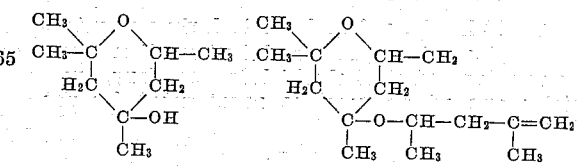

or isomers thereof, are formed, they may be separated from the reaction mixture and further reacted in the presence of an acid-acting compound, e. g. p-toluene-sulfonic acid, preferably under dehydration conditions to produce the dihydropyran and/or isomeric mixtures thereof.

In the execution of the reaction of the unsaturated alcohol with the ketone, the unsaturated alcohol and ketone may be reacted in any proportion. It has been found effective to react the ketone and alcohol in ratio of from 1:1 to about 3:1, but higher or lower ratios may be used if desired in any case. If desired, the reaction may be effected in the presence of solvents or diluents which are relatively inert to the reactants and/or products under the conditions of the reaction, such as hydrocarbons, and the like. These substances when in the liquid stage may serve as solvents or may be added to facilitate removal of the products formed. Aqueous solutions of the reactants or the acid acting compounds may be used, although as a general rule, it is more desirable for greater yields of the dihydropyran to keep as little water as possible present during the reaction. The reaction takes place quite readily under conditions in which the water formed during the reaction is removed continuously. The water may be removed continuously and rapidly by any suitable means, such as by carrying out the reaction in the vapor phase, or by carrying out the reaction in the presence of a suitable dehydrating agent which will not decompose or in any other manner interfere with the process of the reaction. One of the most suitable means for removing water is by adding a substance such as benzene or toluene, etc. which forms a low-boiling azeotrope with water and is readily removed from the reaction mixture.

The unsaturated cyclic ethers prepared by the process of the invention are useful as diluents, modifying agents, and processing reagents in the textile industry, and the higher members particularly are valuable as solvents. They may also be used as reagents and/or additives in the formation of synthetic resins, plastics and synthetic rubbers, and the higher members may serve as insecticides, fungicides, parasiticides or as constituents of insecticidal, fungicidal and parasiticidal compositions, etc. In addition, they are valuable intermediates in the syntheses of valuable organic products; for example the substituted dihydropyrans may be hydrogenated, if desired in the presence of a suitable hydrogenation catalyst such as Raney nickel, to produce novel substituted tetrahydropyran compounds having the formula

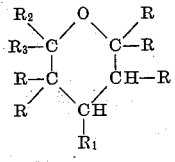

The substituted dihydropyrans may also be halogenated according to any suitable procedure to form novel substituted dihalo-dihydropyrans corresponding to the formula

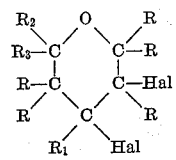

or they may be subjected to halohydrination, e. g. chlorohydrination under suitable conditions. These novel substituted tetrahydropyran compounds and the novel substituted dihalo-dihydropyrans and monohalo-tetrahydropyranols may serve a variety of useful purposes as solvents, modifying agents, and they may also be used as reagents and/or additives in the formation of synthetic resins, plastics and synthetic rubbers, as well as for intermediates in organic syntheses.

The novel substituted tetrahydropyranol compounds which may be produced as intermediates in the formation of the substituted dihydropyrans are useful as solvents, modifying agents, and processing reagents, and in addition to being capable of further reaction to produce the dihydropyrans, they may be reacted with acids or acid anhydrides to form the corresponding esters. For example, 2,4,6,6-tetramethyl-tetrahydropyranol-4 may be reacted with acetic acid or acetic anhydride to form 2,4,6,6-tetramethyl-tetrahydropyran-4-yl acetate.

The following examples are introduced for the purpose of illustrating modes of executing the process of the invention.

*Example I*

Approximately 116 parts by weight of acetone was refluxed with about 100 parts by weight of 4-methyl-4-pentene-2-ol in the presence of about 1 part by weight of p-toluenesulfonic acid for approximately an hour. Acetone was slowly distilled from the reaction mixture until the reflux temperature was about 95° C., and the reaction mixture was then neutralized and distilled to give about 21 parts by weight of product having a boiling point of 136° C. to 143° C. at 770.8 mm. The product having an empirical formula of $C_9H_{16}O$ and boiling at 142° C. to 142.4° C. at 770.8 mm. is mainly 2,4,6,6-tetramethyl-5,6-dihydro-1,2-pyran.

*Example II*

A mixture consisting of about 100 parts by weight of 4-methyl-4-pentene-2-ol, about 120.1 parts by weight of acetophenone, about 183 parts by weight of benzene and approximately 2 parts by weight of p-toluenesulfonic acid was refluxed under a fractionating column for approximately 10 hours at about 95° C. to about 103° C., removing water by azeotropic distillation. The reaction mixture was neutralized and distilled to give about 36 parts by weight of material of boiling point 55° C. to 65° C. at 1 mm. from which was obtained the product having the formula $C_{14}H_{18}O$, boiling at 60.4° C. to 60.8° C. at 1 mm. and consisting mainly of 2,4,6-trimethyl-6-phenyl-5,6-dihydro-1,2-pyran.

*Example III*

A mixture of about 150 parts by weight of 4-methyl-4-pentene-2-ol and about 147.2 parts by weight of cyclohexanone with about 200 parts by weight of benzene and about 2 parts by weight of p-toluenesulfonic acid was refluxed under a colume for approximately four and one-half hours at about 94° C. to about 100° C., removing water by azeotropic distillation. Distillation of the neutralized reaction mixture gave about 191.8 parts by weight of material of boiling point 80° C. to 90° C. at 10 mm., from which was obtained the composition corresponding to the formula $C_{12}H_{20}O$ boiling at 87.4° C. at 10 mm. which consists substantially of 2,4-dimethyl-6,6-pentamethylene-5,6-dihydro-1,2-pyran.

*Example IV*

A mixture consisting of about 210 parts by weight of 3,3,5-trimethylcyclohexanone, about 150 parts by weight of 4-methyl-4-pentene-2-ol, about 250 parts by weight of benzene, and about 2 parts by weight of p-toluenesulfonic acid was refluxed under a column at about 91° C. to 97° C.

for approximately 10 hours with removal of water by azeotropic distillation. Neutralization and distillation of the reaction mixture gave about 182.3 parts by weight of material having a boiling point of 90° C. to 96° C. at 5 mm. from which was obtained the product having the elemental composition indicated by the formula $C_{15}H_{26}O$ boiling at 94.6° C. at 5 mm. and consisting substantially at 2,4-dimethyl-6,6-(2',2',4'-trimethylpentamethylene)-5,6-dihydro-1,2-pyran.

*Example V*

Approximately 98.1 parts by weight of mesityl oxide and about 100 parts by weight of 4-methyl--4-pentene-2-ol with about 150 parts by weight of benzene and approximately 2 parts by weight of p-toluenesulfonic acid was refluxed under a column for approximately 8 hours at about 95° C. to 98° C., removing water by azeotropic distillation. By distillation of the neutralized reaction mixture, about 41 parts by weight of material of boiling point 54° C. to 60° C. at 5 mm. was obtained from which was recovered the product shown by analysis to have the empirical formula $C_{12}H_{20}O$ and boiling at 58.4° C. to 59° C. at 5 mm. and is mainly 2,4,6-trimethyl-6-isocrotyl-5,6-dihydro-1,2-pyran.

*Example VI*

A mixture consisting of about 144 parts by weight of methyl ethyl ketone, about 100 parts by weight of 4-methyl-4-pentene-2-ol and about 2 parts by weight of p-toluenesulfonic acid was refluxed under a column at about 88° C. to about 95° C. for approximately 16 hours, removing water by distillation. The reaction mixture was neutralized and distilled to give about 95.2 parts by weight of material boiling at 160° C. to 166° C. at 757.9 mm. from which was obtained the product of the empirical formula $C_{10}H_{18}O$ boiling at 165.3° C. to 166° C. at 757.9 mm. and consisting mainly of 2,4,6-trimethyl-6-ethyl-5,6-dihydro-1,2-pyran.

*Example VII*

A mixture of about 150 parts by weight of methyl isobutyl ketone and about 150 parts by weight of 4-methyl-4-pentene-2-ol with about 200 parts by weight of benzene and approximately 2 parts by weight of p-toluenesulfonic acid was refluxed for about six and one-half hours under a column at a temperature of about 91 C. to about 95° C. with removal of water. The reaction mixture was neutralized and distilled and gave about 92.4 parts by weight of material boiling at 90° C. to 105° C. at 40 mm. from which was obtained a product of the empirical formula $C_{12}H_{22}O$ having a boiling point of 101.7° C. to 102.4° C. at 40 mm. which is mainly 2,4,6-trimethyl-6-isobutyl-5,6-dihydro-1,2-pyran.

We claim as our invention:

1. 2,4,6,6-tetramethyl-5,6-dihydro-1,2-pyran.
2. A process for the production of 2,4,6,6-tetramethyl-5,6-dihydro-1,2-pyran which comprises reacting acetone with 4-methyl-4-pentene-2-ol in the presence of p-toluenesulfonic acid at reflux temperature.
3. 2,4 - dimethyl-6,6-(2',2',4'-trimethylpentamethylene) 5,6-dihydro-1,2-pyran.
4. A process for the production of 2,4-dimethyl-6,6 - (2',2',4'-trimethylpentamethylene)-5,6-dihydro-1,2-pyran which comprises reacting 3,3,5-trimethylcyclohexanone with 4 - methyl-4-pentene-2-ol in benzene in the presence of p-toluenesulfonic acid at a temperature between about 91° C. and about 97° C.
5. 2,4,6 - trimethyl-6-isocrotyl-5,6-dihydro-1,2-pyran.
6. A process for the production of 2,4,6-trimethyl - 6-isocrotyl-5,6-dihydro-1,2-pyran which comprises reacting mesityl oxide with 4-methyl-4-pentene-2-ol in benzene in the presence of p-toluenesulfonic acid at a temperature between about 95° C. and about 98° C.
7. A 2,4 - dimethyl-6,6-dihydrocarbyl-5,6-dihydrol-1,2- pyran.
8. A process for the production of a pyran compound which comprises reacting a ketone with 4-methyl-4-pentene-2-ol in the presence of an acidic condensation catalyst at a temperature between 50° C. and 105° C..
9. A process for the production of a pyran compound which comprises reacting a ketone with an unsaturated alcohol containing an unsaturated tertiary carbon atom linked directly by a single bond to a saturated carbon atom which is directly attached to the carbinol carbon atom, in the presence of an acidic condensation catalyst at a temperature above about 50° C. but not substantially above the temperature of dehydration of the alcohol.
10. A 6,6-dihydrocarbyl-5,6-dihydro-1,2-pyran wherein the carbon atom in the 4 position is directly attached to a non-olefinic hydrocarbon radical.
11. A 2,4,6,6-tetrahydrocarbyl-5,6-dihydro-1,2-pyran.

PAUL H. WILLIAMS.
SEAVER A. BALLARD.

REFERENCES CITED

The following references are of record in the file of this patent:

UNITED STATES PATENTS

| Number | Name | Date |
| --- | --- | --- |
| 2,310,943 | Dorough | Feb. 16, 1943 |
| 2,312,298 | Marple | Feb. 23, 1943 |